US008511728B2

(12) United States Patent  
Beaton

(10) Patent No.: US 8,511,728 B2  
(45) Date of Patent: Aug. 20, 2013

(54) WASTE COLLECTION DEVICE FOR CATCHING AND COLLECTING ANIMAL DROPPINGS

(76) Inventor: Alec A. Beaton, East Syracuse, NY (US)

(*) Notice: Subject to any disclaimer, the term of this patent is extended or adjusted under 35 U.S.C. 154(b) by 0 days.

(21) Appl. No.: 13/418,704

(22) Filed: Mar. 13, 2012

(65) Prior Publication Data

US 2012/0235431 A1 Sep. 20, 2012

Related U.S. Application Data

(60) Provisional application No. 61/452,309, filed on Mar. 14, 2011.

(51) Int. Cl.
*A01K 29/00* (2006.01)

(52) U.S. Cl.
USPC .......................................................... 294/1.4

(58) Field of Classification Search
USPC ................ 294/1.3–1.5; D30/162; 15/257.1, 15/257.4, 257.6, 257.7, 257.8; 56/400.11; 248/95, 99, 101
See application file for complete search history.

(56) References Cited

U.S. PATENT DOCUMENTS

| | | | |
|---|---|---|---|
| 1,266,522 A * | 5/1918 | Oldham | 141/108 |
| 3,688,483 A | 9/1972 | Hamilton | |
| 3,733,099 A | 5/1973 | Szita | |
| 4,012,067 A | 3/1977 | Travis | |
| 4,146,259 A * | 3/1979 | Schultz | 294/1.4 |
| 4,149,745 A | 4/1979 | Willis | |
| D267,593 S * | 1/1983 | Crawford et al. | D34/1 |
| 4,466,647 A | 8/1984 | Spevak | |
| 4,705,310 A | 11/1987 | Scripter | |
| 4,852,924 A | 8/1989 | Ines | |
| 4,958,871 A | 9/1990 | Hemans | |
| 4,986,587 A | 1/1991 | Lozano | |
| 5,620,221 A | 4/1997 | Wilke | |
| 5,676,411 A | 10/1997 | Kwok | |
| 5,683,129 A | 11/1997 | Jensen | |
| 5,868,447 A | 2/1999 | Clark et al. | |
| 5,915,769 A | 6/1999 | Kidd | |
| 5,971,452 A | 10/1999 | Marymor et al. | |
| 6,003,913 A | 12/1999 | Flumiani | |
| 6,039,369 A | 3/2000 | Stahovic | |
| 6,039,370 A | 3/2000 | Doolet, Jr. et al. | |
| 6,123,046 A | 9/2000 | Gemeniano | |
| 6,149,214 A | 11/2000 | Kipka et al. | |
| 6,227,149 B1 | 5/2001 | Host et al. | |
| 6,386,606 B1 | 5/2002 | Marshall | |
| 6,394,514 B1 | 5/2002 | Kidd | |
| 6,485,073 B2 | 11/2002 | Harrison | |
| 6,702,349 B2 | 3/2004 | Clements | |

(Continued)

*Primary Examiner* — Paul T Chin  
(74) *Attorney, Agent, or Firm* — Brown & Michaels, PC

(57) ABSTRACT

A waste collection device comprising a handle having a grip end and a head end; a head assembly mounted to the head end of the handle defining an opening for receiving and attaching a bag comprising: a symmetric head structure; a pair of peg supports on either side of the head structure; a pair of arm supports mounted to the head structure and extending away from the head structure; and a blade having blade arm portions mounted to the pair of arm supports and a flat spade portion on a first side for scooping waste droppings from a flat surface into the bag, and a rounded tongue for scooping waste from an irregular surface into the bag; such that the bag fits in the opening formed by the head assembly, is folded over the arm supports and the a portion of the blade, and is secured to the head assembly.

19 Claims, 17 Drawing Sheets

(56) References Cited

U.S. PATENT DOCUMENTS

| | | |
|---|---|---|
| 6,736,436 B1 | 5/2004 | Tsou |
| 6,942,264 B1 | 9/2005 | Mendez |
| 7,090,268 B2 | 8/2006 | Borman |
| 7,188,878 B1 | 3/2007 | Kraus |
| 7,198,310 B1 | 4/2007 | Lau |
| 7,204,532 B2 | 4/2007 | Lefevre |
| 7,204,533 B2 | 4/2007 | Kaas et al. |
| 7,232,165 B2 | 6/2007 | Zelon |
| 7,267,381 B2 | 9/2007 | Cafferty et al. |
| 7,431,361 B2 | 10/2008 | Pilas |
| 7,484,859 B1 * | 2/2009 | Burke .......... 362/120 |
| 7,618,073 B2 | 11/2009 | Casper |
| 7,631,910 B2 | 12/2009 | Shalhoub |
| 7,744,136 B2 | 6/2010 | Waltz |
| 7,854,455 B2 | 12/2010 | Ruscil et al. |
| 2004/0080168 A1 * | 4/2004 | Tsou .......... 294/1.4 |
| 2004/0164568 A1 * | 8/2004 | Diehl .......... 294/1.4 |
| 2008/0211244 A1 * | 9/2008 | Tittemore .......... 294/1.4 |
| 2009/0058114 A1 * | 3/2009 | Diehl .......... 294/1.4 |
| 2009/0072559 A1 * | 3/2009 | Wilkerson .......... 294/1.4 |

\* cited by examiner

US 8,511,728 B2

WASTE COLLECTION DEVICE FOR CATCHING AND COLLECTING ANIMAL DROPPINGS

REFERENCE TO RELATED APPLICATIONS

This application claims one or more inventions which were disclosed in Provisional Application No. 61/452,309, filed Mar. 14, 2011, entitled "HAND TOOL FOR CATCHING AND COLLECTING ANIMAL DROPPINGS". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field methods and apparatus for collecting pet droppings. More particularly, the invention pertains to a dual function waste collection device for sanitarily catching and collecting pet droppings.

2. Description of Related Art

Numerous devices deal with the catching of pet droppings. Other devices deal with the scooping up of pet droppings. In many instances, both types of these devices are necessary to clean up after a pet in the yard and while taking a pet for a walk. Further, some of these devices work better than others when used on irregular, unpaved surfaces such as lawns. Most necessitate being used in daylight. Some devices require to be used in a bent over position, undesirable to many users. Still others require close handling of the pet droppings which can expose a user and device to unsanitary direct contact with pet waste or pet droppings.

One prior art device consists of two main parts, a handled shovel and a handled rake and requires both to work together in order to pick up pet droppings. This device may also be used where the handled shovel and handled rake are connected in a scissors configuration. The main disadvantage of this device is that both hands of a user are simultaneously required to work the device, while at the same time holding and controlling the pet. This device is awkward and cumbersome to use if walking a pet. Also, a bag would need to be carried along to later discard any droppings collected with the device. Some of the disadvantages shared by these types of devices are the soiling of device when using the device to collect the pet droppings and thus the necessary cleaning of the device after use; both hands of the user required to use the device; the awkwardness of carrying the device around when handling the pet; the difficulty of collecting pet droppings at night when a light is unavailable; and having to carry from the device, a bag containing collected pet droppings, in addition to walking and/or controlling the pet or pets.

Pet waste hand bags have also been used with pet waste collection. The disadvantages of collecting pet waste using a bag are: the user having to bend over to collect the droppings from the ground; direct contact with the pet waste which is unsanitary; difficulty of collecting pet droppings at night when a light is unavailable; the difficulty in collecting droppings which have a substantially "loose/soupy" or less than solid consistency; multiple bags may be needed to collect waste during one pet outing; and carrying more than one bag of pet waste while simultaneously controlling and/or walking pets.

Another type of prior art pet waste collection device consists of a squeeze handle at one end and a claw type clam shell at the other end. The disadvantages of this device are: the device cannot be used to catch pet droppings while walking the pet; soiling of the device during use and cleaning of the device required after use; difficult to use on some surfaces with high grass; difficult to use on "soupy" waste; difficult to collect waste at night unless a light is available; impractical when walking more than one pet; and having to separately carry from the device, a bag containing collected pet droppings. Furthermore, the device may be unsanitary if the device is not cleaned after use. Plus, if the device is not cleaned properly after using, waste can adhere and harden onto the device making its difficult. The removal of the hardened waste in fact, can damage the device itself.

All of these aforementioned devices are lacking practicality and usability when applying them to a large yard clean-up job of pet waste especially in the early spring when the snow melts away. If the pet or pets use the yard throughout the winter, the opportunity to collect waste is limited by the short daylight hours. Also problematic in regions where snowfall is very frequent, the waste will be covered. Only when the snow melts in the spring can the yard be cleaned up. Pets will most likely step in the waste and track it back into the house.

SUMMARY OF THE INVENTION

A waste collection device comprising a handle having a grip end and a head end; a symmetrical, dual-sided head assembly mounted to the head end of the handle defining an opening on either side for receiving and attaching a bag comprising: a head structure; a bag support peg on either side of the head structure; a bag securing grommet or clamp on either face of the head structure; a support arm on either side and extending away from the head structure for receiving the blade and attached bag; and a multi-edged blade having juxtaposed portions mounted to the extended arm supports having at least one spade flat edged portion for scooping waste droppings from flat surfaces into the bag, and a curved edged portion on another side for scooping waste droppings on irregular surfaces into an attached bag; such that a bag fits in the opening formed by the head assembly, is folded over the top of the blade and arm supports, and is secured to the head assembly

DETAILED DESCRIPTION OF THE INVENTION

Figure 1:
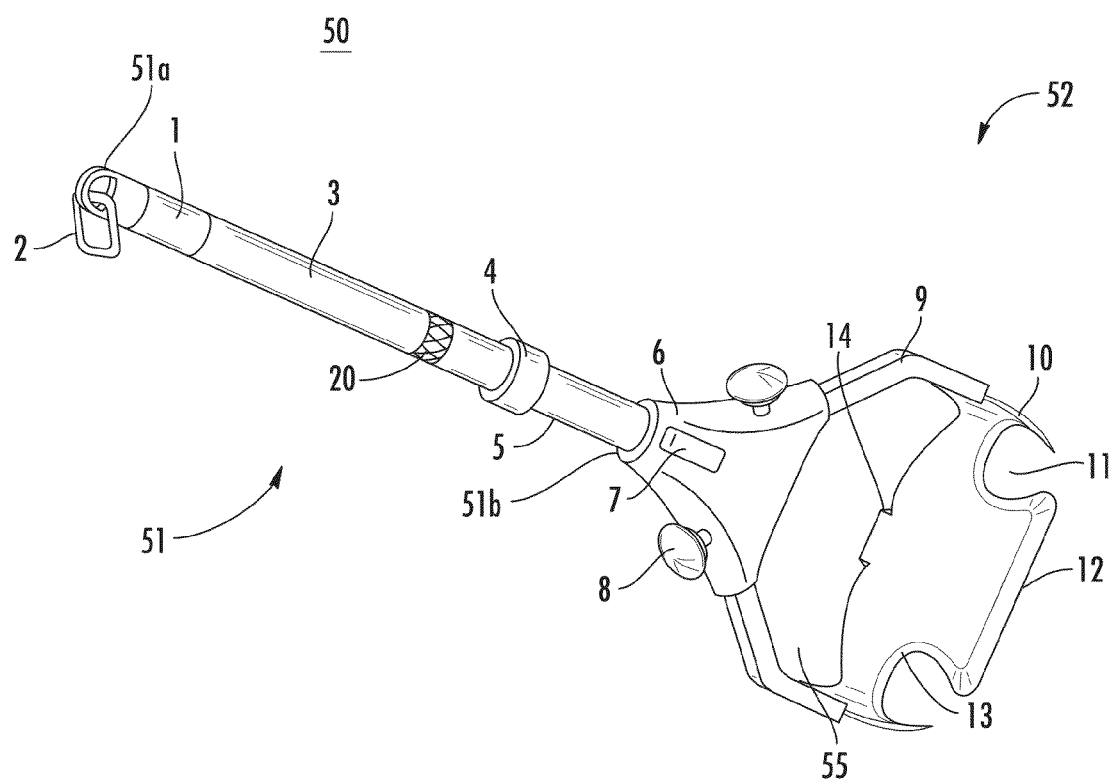
FIG. 1 shows a perspective view of the waste collection device of a first embodiment.
Figure 2:
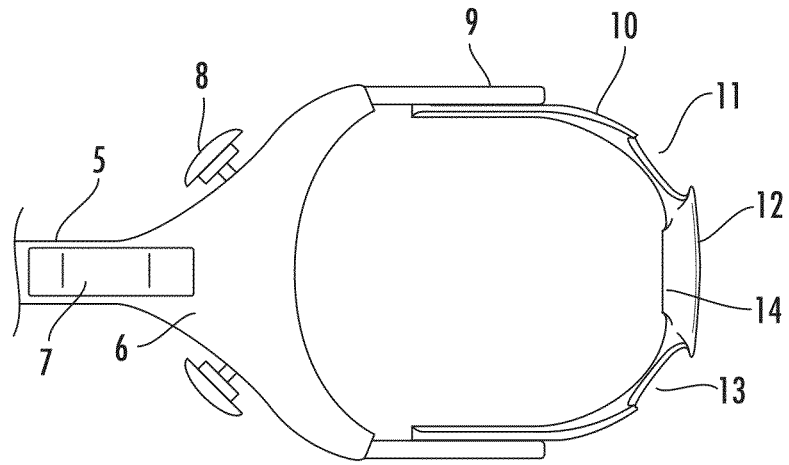
FIG. 2 shows a top view of the head assembly of the waste collection device of a first embodiment.
Figure 3:
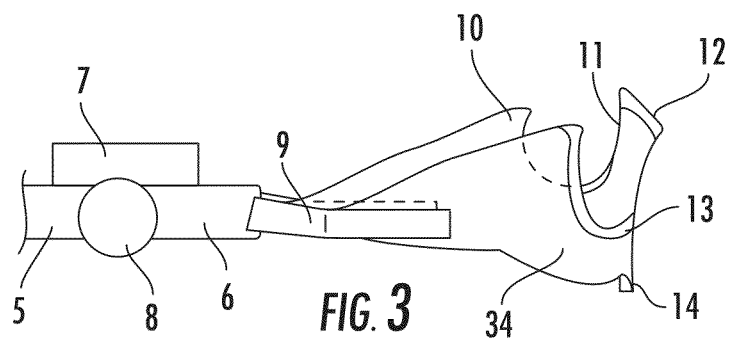
FIG. 3 shows a right side view of the head assembly of the waste collection device of a first embodiment.
Figure 4:
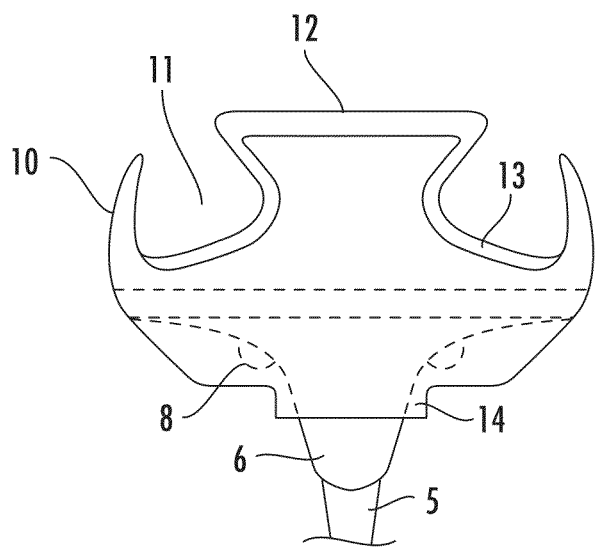
FIG. 4 shows a front view of the head assembly of the waste collection device of a first embodiment.
Figure 5:
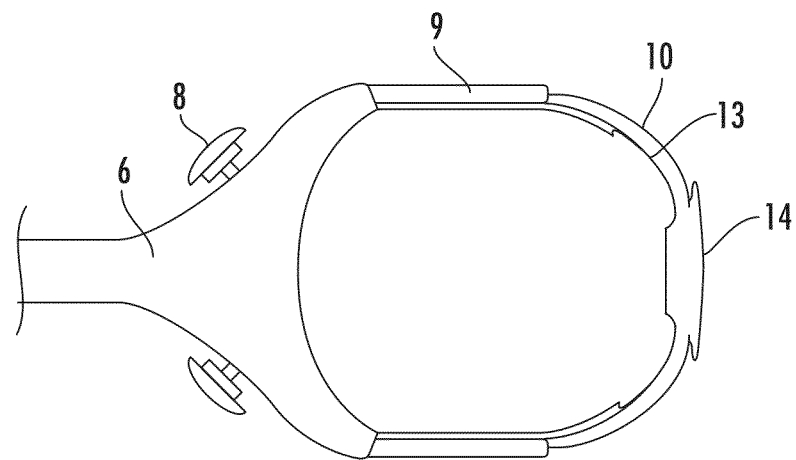
FIG. 5 shows a bottom view of FIG. 2 of the head assembly of the waste collection device of a first embodiment.
Figure 6:
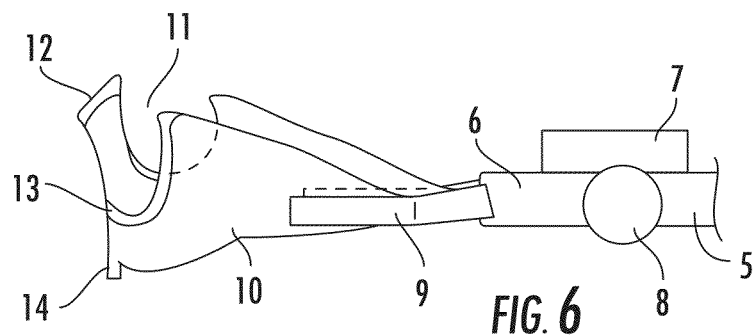
FIG. 6 shows a left side view of the head assembly of the waste collection device of a first embodiment.
Figure 7:
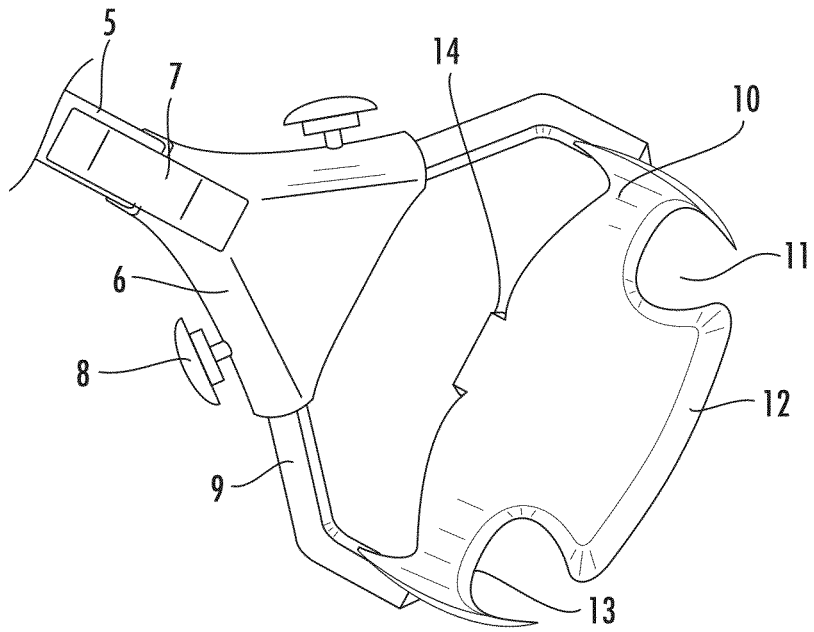
FIG. 7 shows a perspective top rear view of the head assembly of the collection device of a first embodiment.
Figure 8:
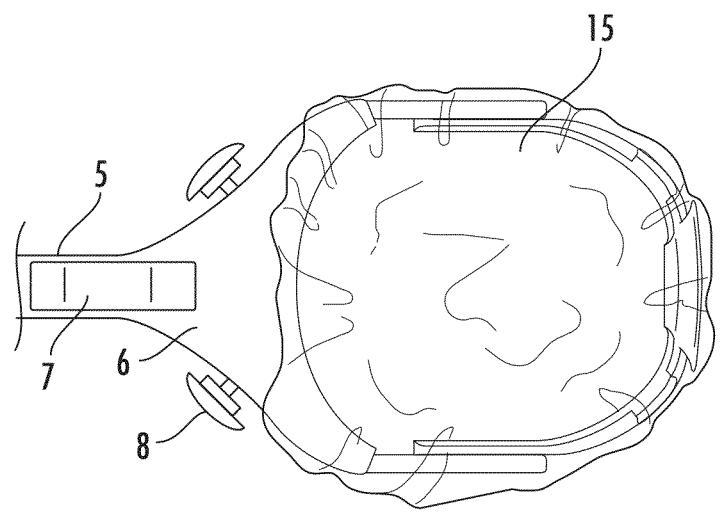
FIG. 8 shows a top view of FIG. 2 of the head assembly of the waste collection device of a first embodiment fitted with a plastic bag.

The present invention is a waste collection device that may be used to catch dropping when walking the pet or for collecting pet waste already deposited on a surface.

FIGS. 1-7 show a waste collection device 50 of a first embodiment. The device 50 has a telescopic handle 51 with a first extended position shown in FIG. 1 and a second non-extending position. The telescoping handle 51 includes a handle grip 1, an upper section 3, a lower section 5, and a telescope handle adjust 4 connecting the upper section 3 to the lower section 5 and being able to move the upper section 3 relative to the lower section 5 and between the first extended position and the second non-extended position. The waste collection device includes a spring clip 2 attached to the handle grip 1 to attach the device 50 to a leash to free up one hand of the user. When the device 50 is clipped to the leash, the telescoping handle 51 is preferably in the non-extended position The telescoping handle 51 prevents the user from having to stoop or bend down to catch the waste or scoop the waste droppings and can be placed in a non-extended position for easy carrying and storage. The telescoping handle 51 in the non-extended position is approximately 24 inches and in the first extended position, the telescoping handle 51 is approximately 35 inches, although other lengths may also be used. The telescoping handle 51 may be constructed out of plastic or aluminum.

The telescoping handle 51 has a grip end 51a and a head end 51b. The head end 51b is received by a head structure 6. The head structure 6 has a pair of symmetric peg supports 8 mounted on either side of the handle 51 or head structure 6. Attached to and extending away from the head structure 6 are two symmetric arm supports 9 which attach to a blade 10. The two symmetric arm supports 9, the blade 10 and the head structure 6 define an opening 55 which receives a bag 15. The weight of pet waste collected in the bag 15 is supported by the head assembly 52 of the waste collection device which includes two symmetric arm supports 9, the blade 10, the peg supports 8, and the head structure 6. It should be noted that the head structure 6 is symmetric.

The distance inside the head structure 6 between the support arms 9 is approximately 4.25 inches. The distance between the head structure 6 and the blade 10 is preferably approximately 4.5 inches, although other distances may be used. The opening 55 formed between the head structure 6, the arm supports 9 and the blade 10 is an oblong, irregular shaped circle although an oval or other such shape may also be used.

The head structure 6, including the peg supports 8 may be constructed of plastic, nylon, aluminum, or any other sufficiently strong and rigid material. The blade 10 may be made of thin, but strong plastic, nylon or aluminum.

Figure 22:
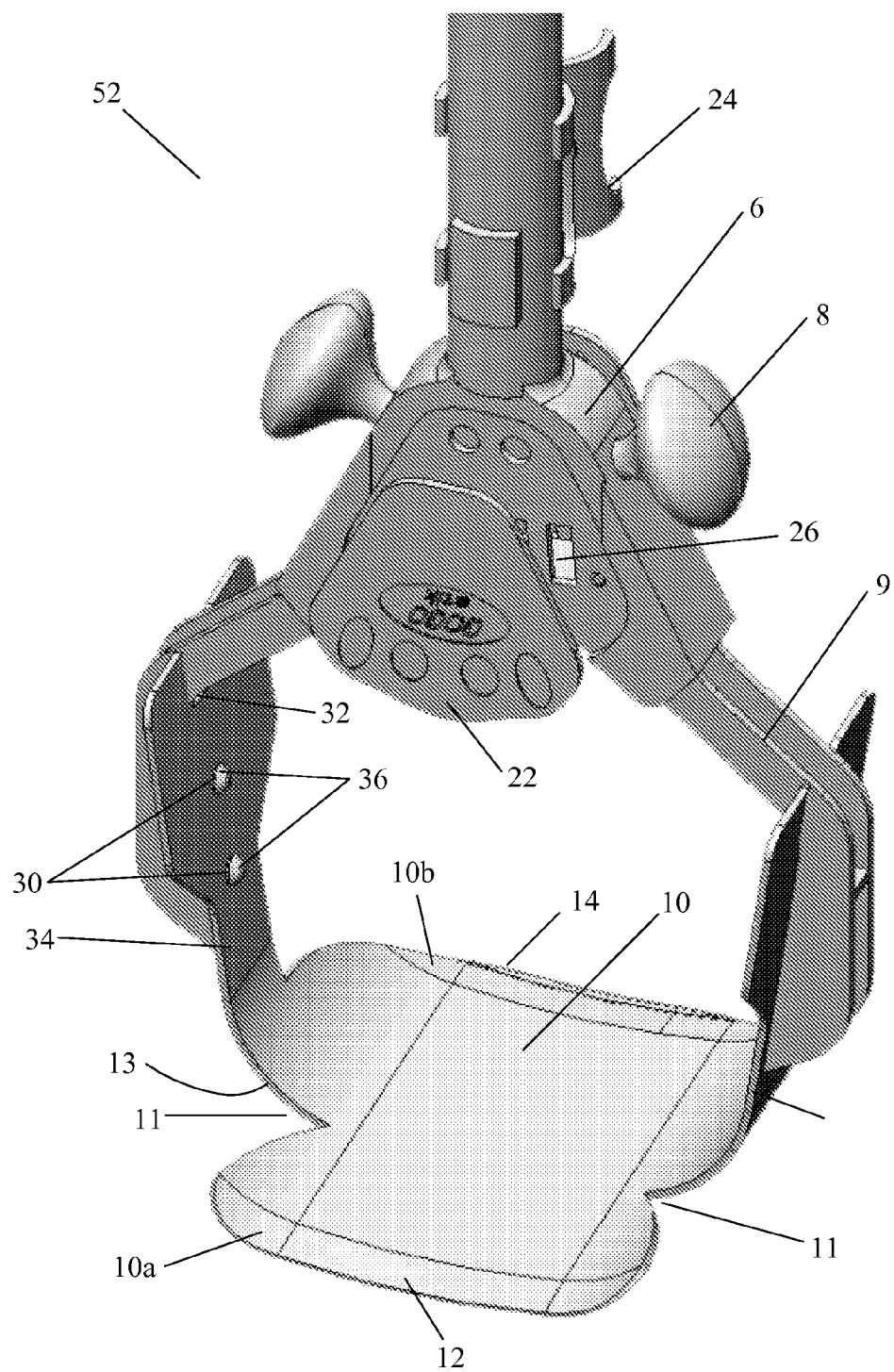
FIG. 22 shows a view of the head assembly of the waste collection device of a second embodiment.

The blade 10 may be removably coupled to the symmetric arm supports 9 or fixed to the symmetric arm supports 9. The blade 10 may be removably coupled through the use of pins or bosses 36 present on the arm supports 9 which are received within holes 30 of the blade arms 34 of the blade 10 such as shown in FIG. 22.

The blade 10 preferably has a first side 10a with a spade portion 12. The spade portion 12 is defined by notches 11 on either side of the spade portion 12 which define part of the blade arm 34. The notches 11 and the spade portion 12 preferably have tapered edges 13. In this embodiment, the spade portion 12 is preferably flat. The spade portion 12 is most effective for scooping up pet waste on a flat, paved surface.

On a second side 10b, opposite the first side 10a and opposite the spade portion 12 is a tongue 14 most effective for scooping through long grass, snow and irregular surfaces.

FIGS. 18-22 show a waste collection device 60 of a second embodiment. The difference between this embodiment and the first embodiment is the addition of a clamp 22 on either side of the symmetric head structure 6, an integral handle 56 to which the telescoping handle 51 is attached, and the blade 10.

The clamp 22 preferably has teeth 23 on an inner surface 22a which mates with corresponding holes 26 on the head structure 6. The clamp 22 is used to grasp and hold a portion of the bag 15 attached to the waste collection device 60. The bag 15 is held in place partly by the mating of the teeth 23 of inner surface 22a of the clamp 22 and the corresponding holes 26 on the head structure 6.

The telescoping handle 51 may be removed and the head assembly may be used with just the integral handle 56. The removal of the telescoping handle also allows the waste collection device 60 to be more easily transported and stored.

In this embodiment, the blade 10 is removably attached to the arm supports 9 of the head structure 6 through pins 36. The blade arms 34 of the blade 10 have holes 30 for receiving the pins 36 located on the arm supports 9. The blade 10 preferably has a first side 10a with a spade portion 12 which is as wide as head structure 6. The spade portion 12 is defined by notches 11 on either side of the spade portion 12 which also define part of the blade arm 34. The pointed portion 11a of the notches 11 assists in keeping the spade portion 12 flat and preventing the flat spade portion 12 from curving or curling towards the head structure 6. The spade portion 12 resembles and performs like a small flat shovel and is most effective for scooping up pet waste on a flat, paved surface.

The second side 10b of the blade 10 has a tongue 14 that substantially extends the entire second side 10b of the blade between the blade arms 34. No notches are present between the tongue 14 and the blade arms 34. The tongue has a curved contour similar to a rounded shovel and most effective for scooping up pet waste found in grass, snow, and on irregular surfaces.

Figure 23:
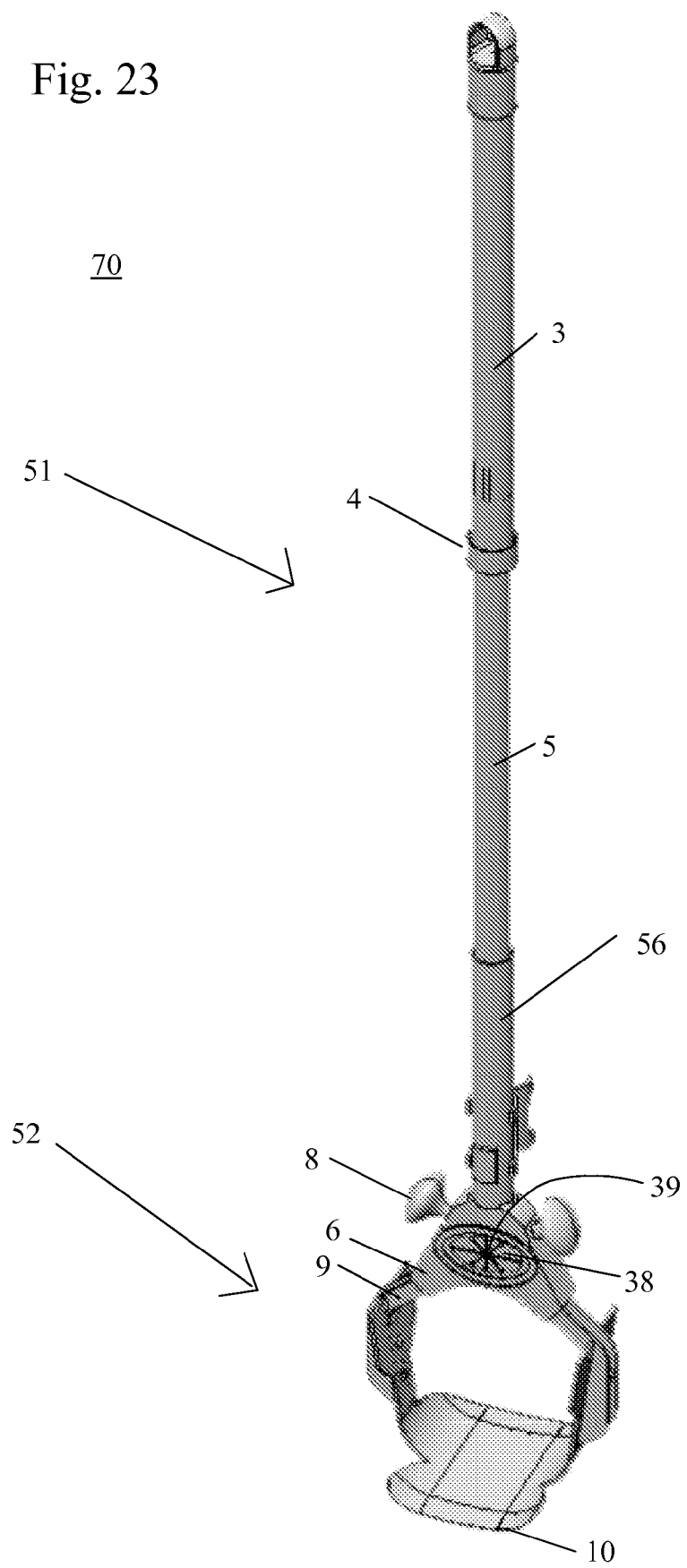
FIG. 23 shows a front view of a waste collection device of a third embodiment.
Figure 24:
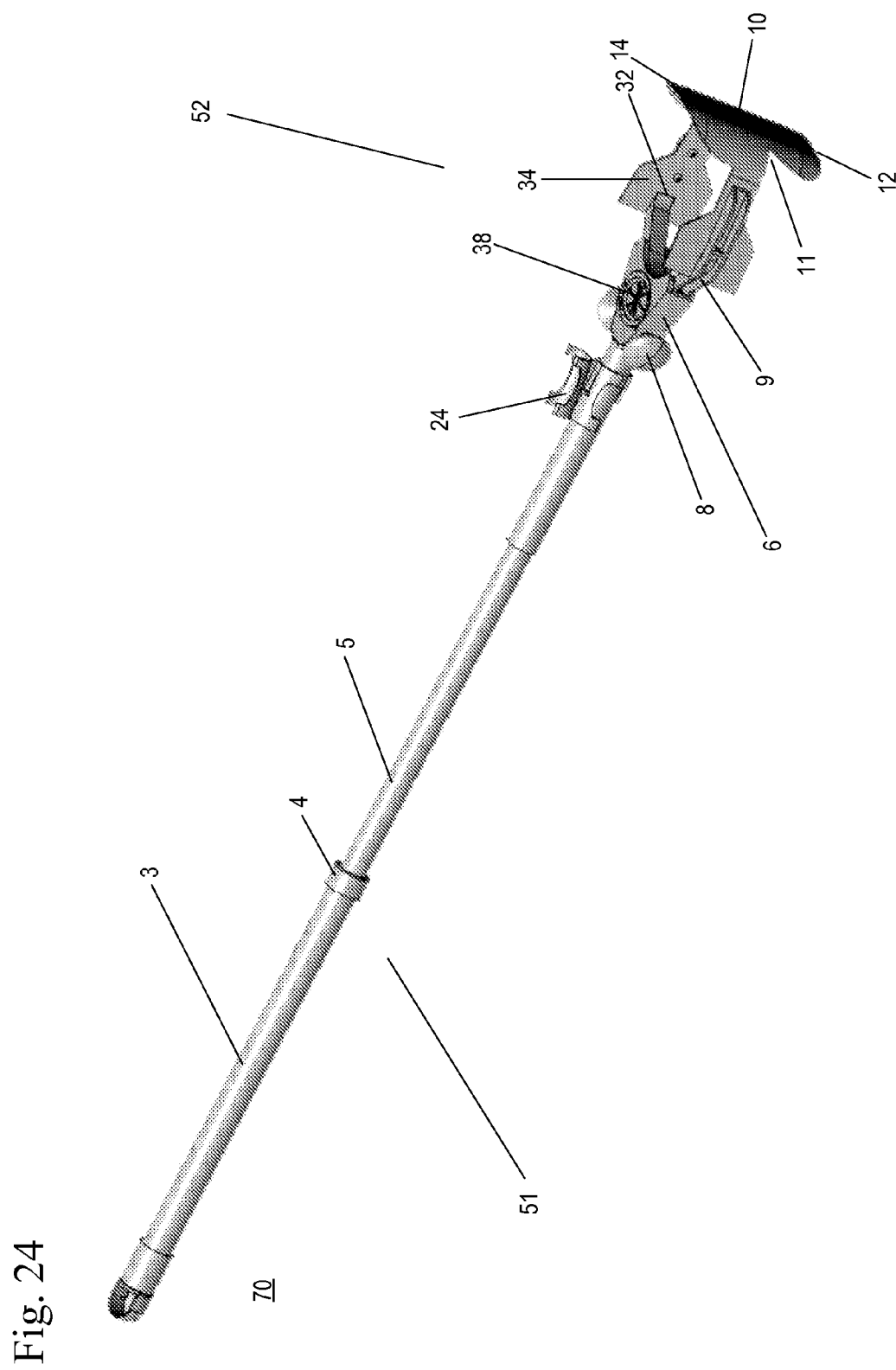
FIG. 24 shows a side view of a waste collection device of a third embodiment.
Figure 25:
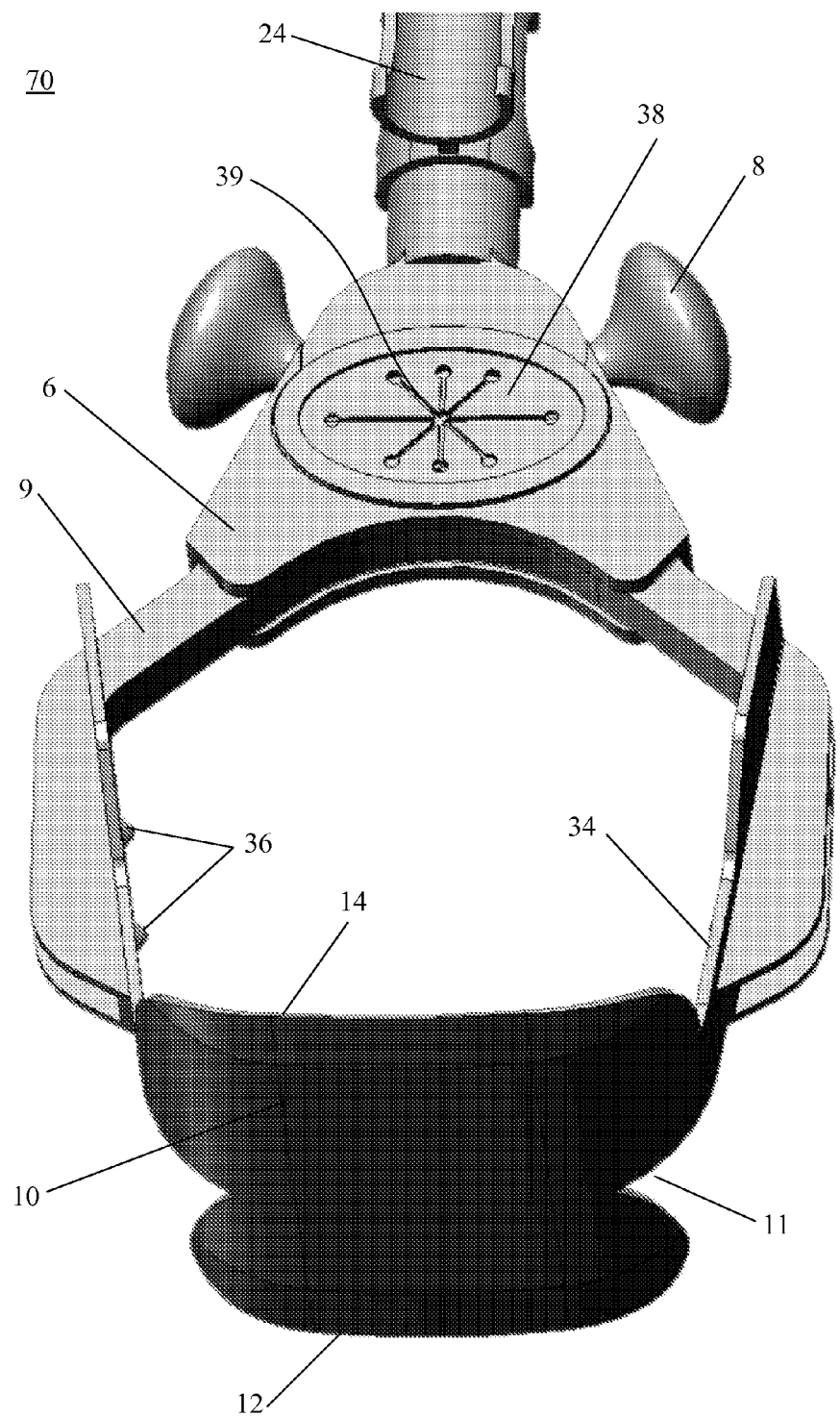
FIG. 25 shows a view of the head assembly of the waste collection device of the third embodiment.

FIGS. 23-25 show a waste collection device 70 of a third embodiment. The difference between this embodiment and the first embodiment is the addition of a flexible grommet covering 38 of a slight depression 39 within the head structure 6 on either side of the symmetric head structure 6. The depression 39 within the head structure 6 can receive a portion of a bag 15 and aid in securing the bag 15 to the waste collection device 70. The bag 15 is held in place within the depression 39 by friction between the flexible covering 38 over the depression 39 and the bag 15. The depression 39 and grommet covering 38 may used in lieu of the pegs 8 for securing bags without handles to the waste collection device 70.

In this embodiment, the blade 10 is removably attached to the arm supports 9 of the head structure 6 through pins 36. The blade arms 34 of the blade 10 have holes 30 for receiving the pins 36 located on the arm supports 9. The blade 10 preferably has a first side 10a with a spade portion 12 which is as wide as head structure 6. The spade portion 12 is defined by notches 11 on either side of the spade portion 12 which also define part of the blade arm 34. The pointed portion 11a of the notches 11 assists in keeping the spade portion 12 flat and preventing the flat spade portion 12 from curving or curling towards the head structure 6. The spade portion 12 resembles and performs like a small flat shovel and is most effective for scooping up pet waste on a flat, paved surface.

The second side 10b of the blade 10 has a tongue 14 that substantially extends the entire second side 10b of the blade between the blade arms 34. No notches are present between the tongue 14 and the blade arms 34. The tongue 14 has a curved contour similar to a rounded shovel and most effective for scooping up pet waste found in grass, snow, and on irregular surfaces.

As in the second embodiment, the telescoping handle 51 may be removed and the head assembly may be used with just the integral handle 56. The removal of the telescoping handle also allows the waste collection device 60 to be more easily transported and stored.

Figure 14:
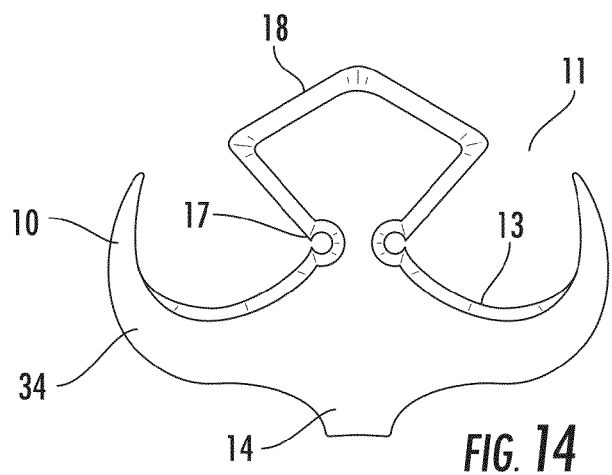
FIG. 14 shows front view of a notched pointed spade blade design of an alternate embodiment.

FIGS. 14-17 show alternative blade 10 configurations that may be used with any of the embodiments of the waste collection devices 50, 60, 70. FIG. 14 shows a blade with a pointed spade 18 defined by notches 11 on either side of the pointed spade 18. The notches are also partly defined by blade arms 34 on a first side 10a of the blade 10. The pointed spade 18 is opposite a tongue 14 on a second side 10b of the blade. The pointed spade 18 and the notches 11 have tapered edges 13. The pointed spade 18 is most effective for scooping up pet waste on irregular surfaces.

Figure 15:
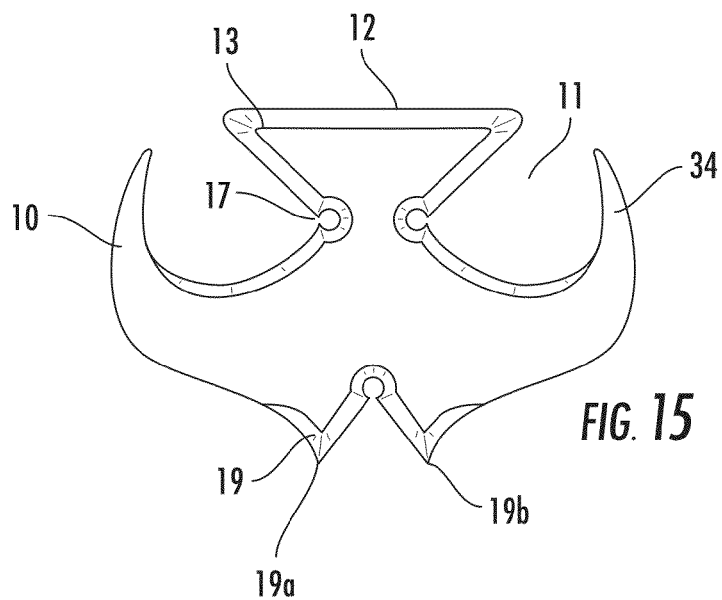
FIG. 15 shows a front view of a notched flat spade blade design of an alternate embodiment.

FIG. 15 shows another blade 10 alternative that may be used with any of the embodiments of the waste collection devices 50, 60, 70 with a first side 10a including a flat spade 12 defined by notches 11 on either side of the flat spade 12. The notches 11 are also partly defined by blade arms 34 on a first side 10a of the blade 10. Pinch pockets 17 are located between the flat spade 12 and the notches 11. The flat spade 12 and the notches 11 preferably have tapered edges 13. Opposite the flat spade 12 on a second side 10b of the blade is a forked tongue 19 having a first fork 19a with a tapered edge 13 and a second fork 19b with a tapered edge 13 effective for scooping up pet waste in deep grasses. The pinch pockets 17 assist in keeping the bag 15 fixed in place on the waste collection device 50, 60, 70 and by removing excess slack of the bag 15 when mounted on the waste collection device 50, 60, 70.

Figure 16:
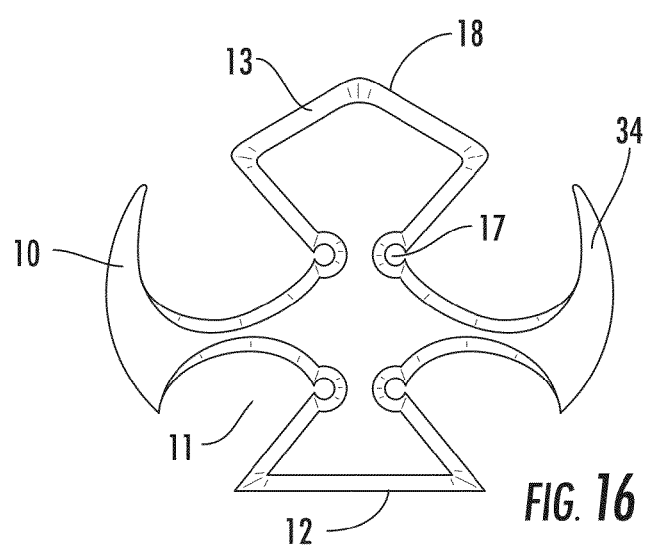
FIG. 16 shows a front view of a dual function reversible blade depicting a notched pointed spade blade on the top side and a notched flat spade blade on the bottom side of another alternate embodiment.
Figure 17:
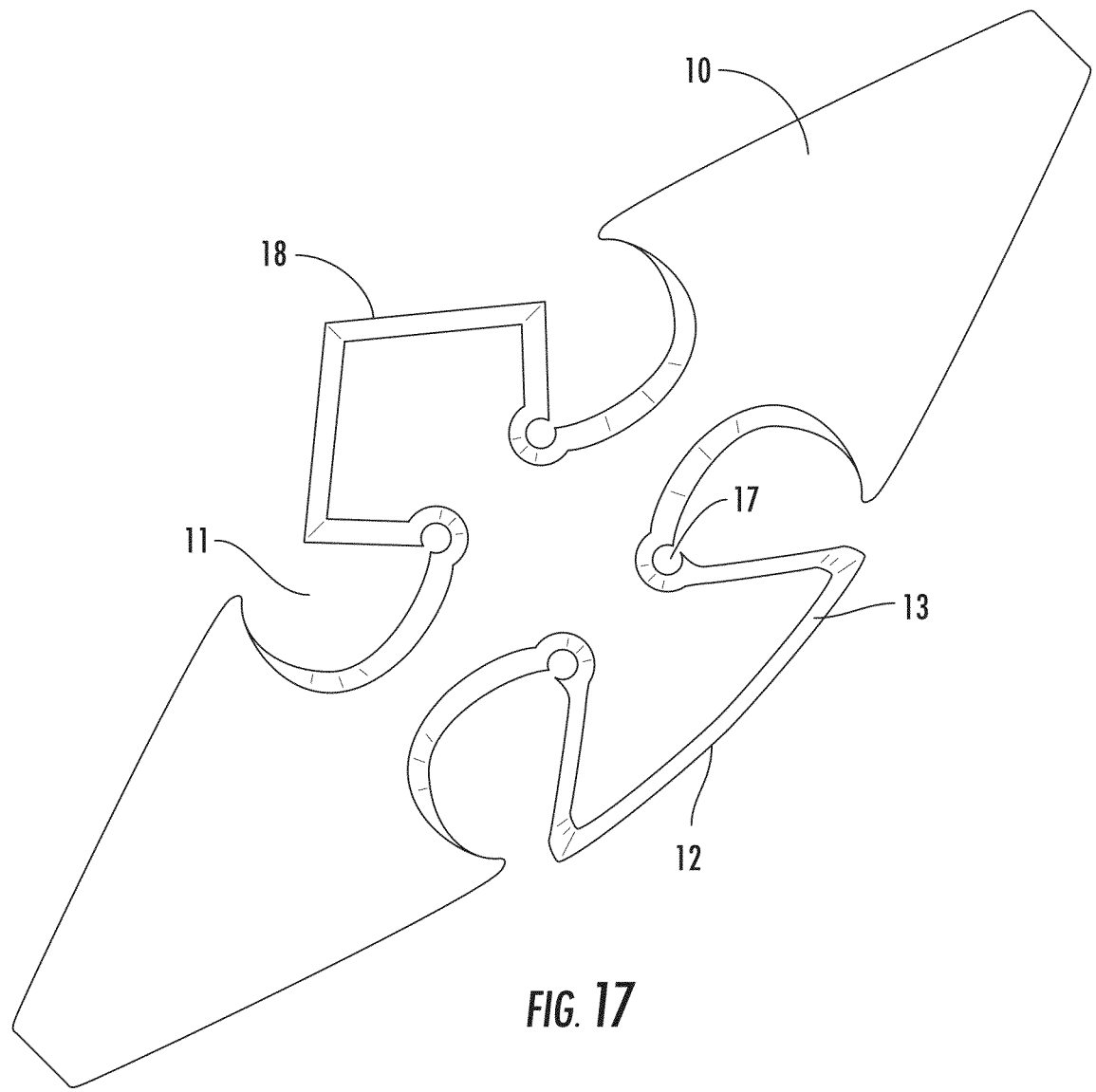
FIG. 17 shows a two dimensional representation of the dual function reversible blade depicting a notched pointed spade blade on the top side and a notched flat spade blade on the bottom side of another alternate embodiment.
Figure 18:
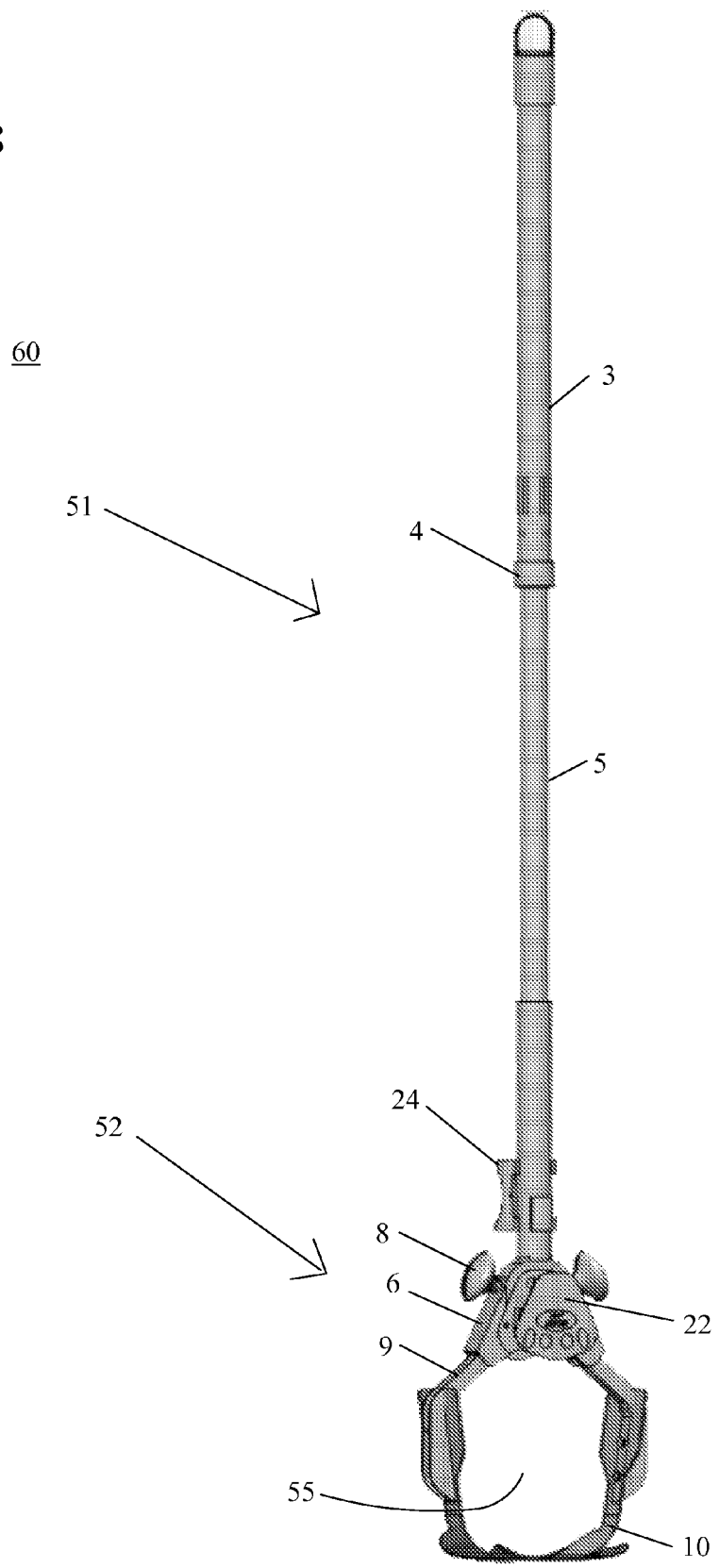
FIG. 18 shows an angled front view of a complete waste collection device of a second embodiment.
Figure 19:
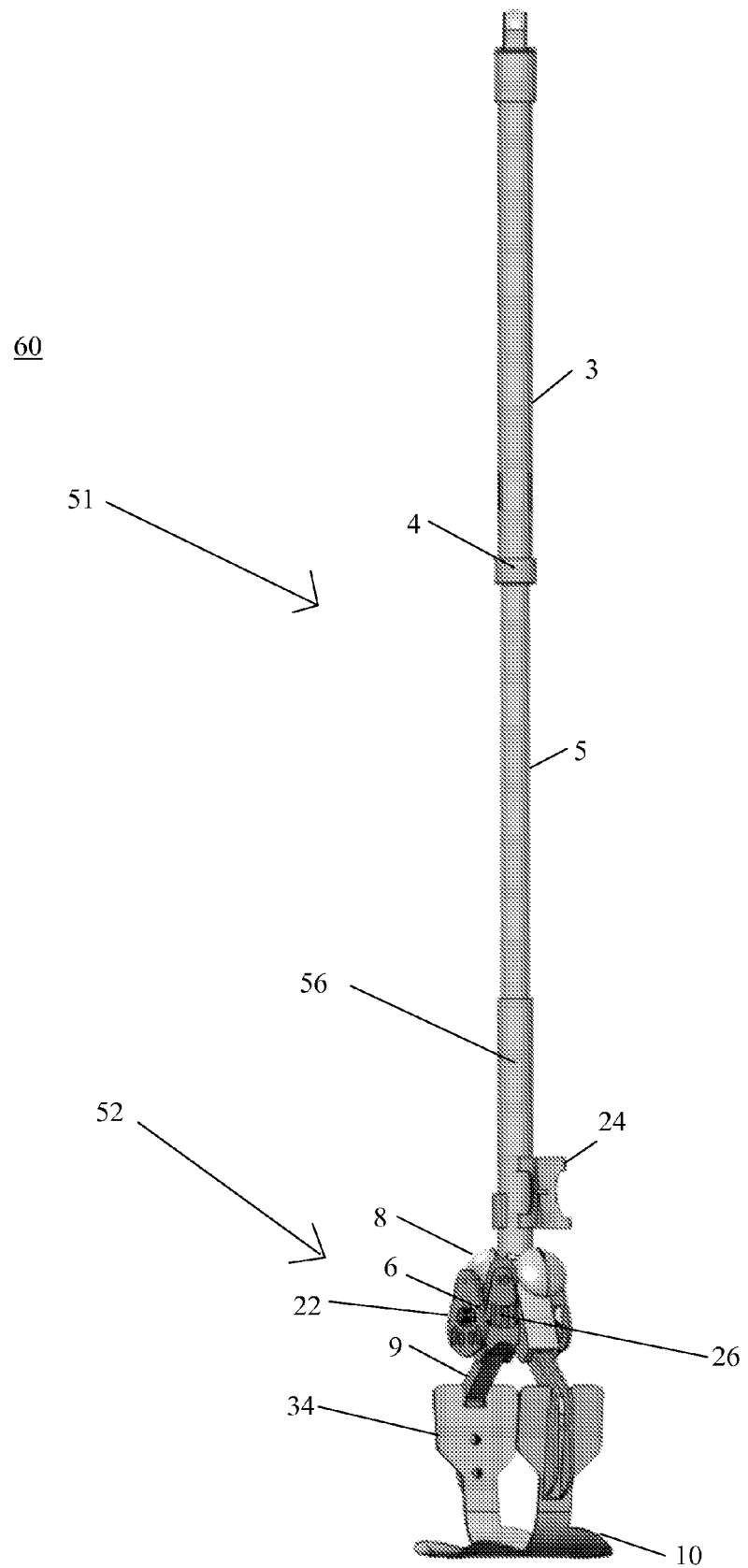
FIG. 19 shows a side view of a waste collection device of a second embodiment.
Figure 20:
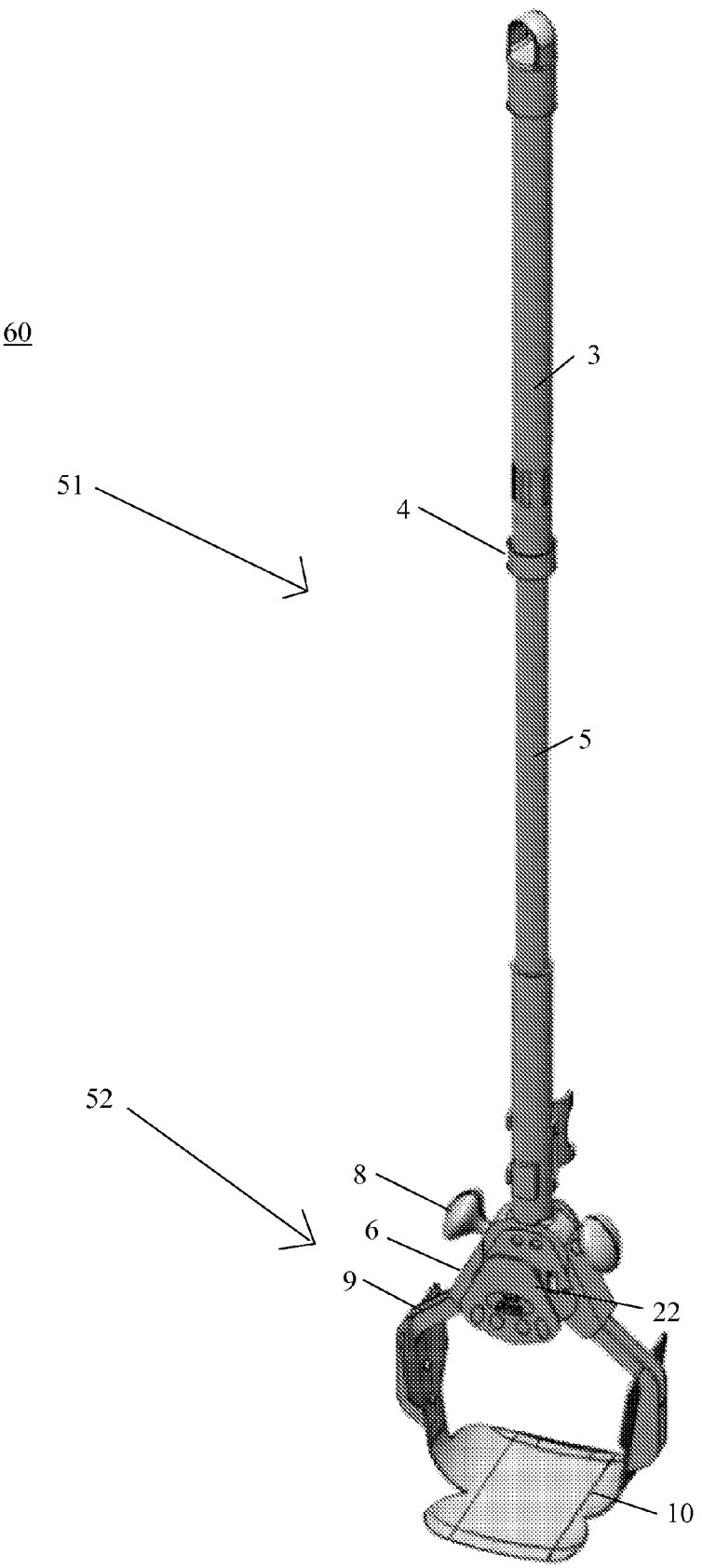
FIG. 20 shows a front view of a waste collection device of a second embodiment.
Figure 21:
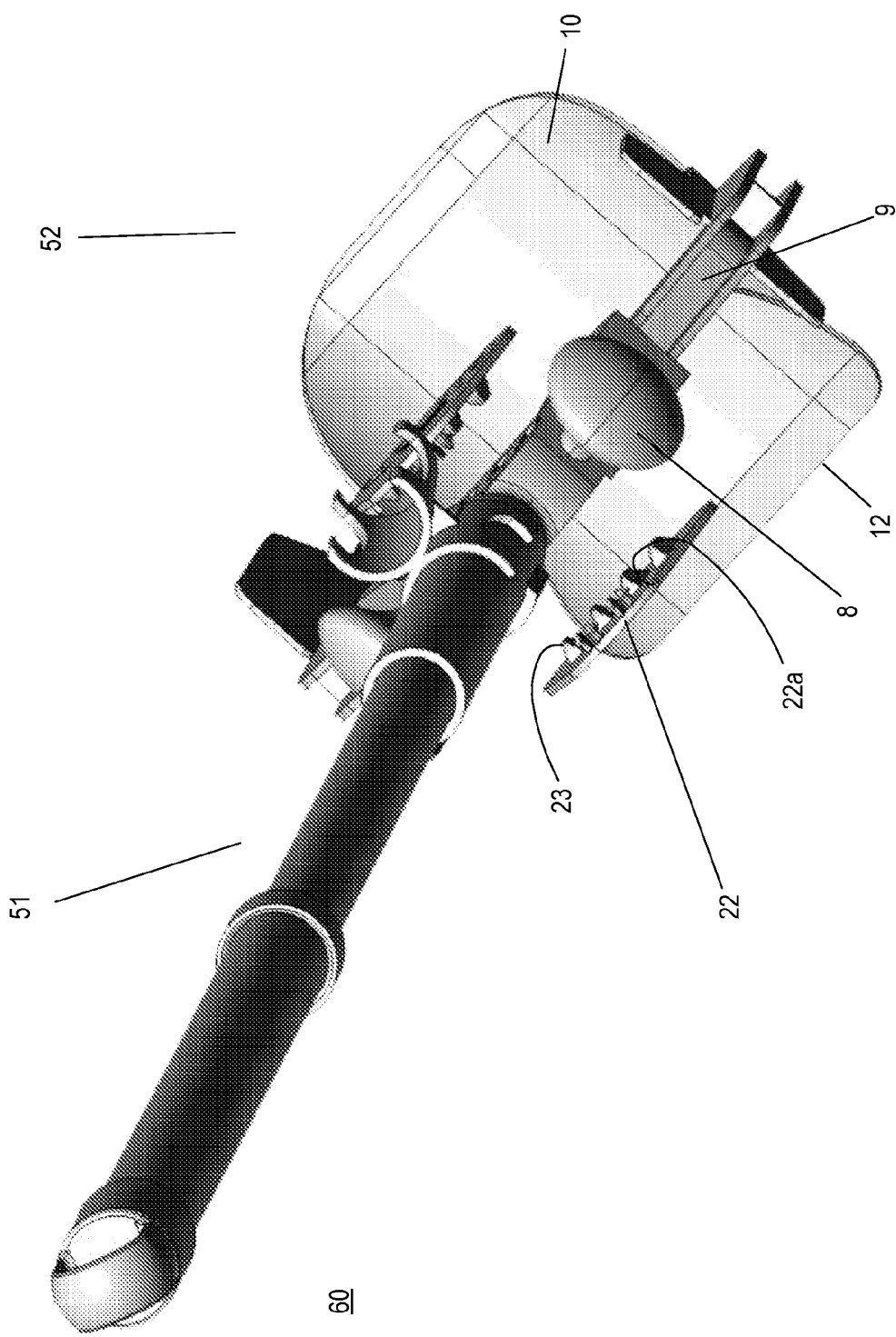
FIG. 21 shows a top down view of a waste collection device of a second embodiment.

FIG. 16 shows an alternative blade with a first side 10a including pointed spade 18 defined by notches 11 on either side of the pointed spade 18. The notches 11 are also partly defined by blade arms 34 on a first side 10a of the blade 10. Pinch pockets 17 are located between the pointed spade 18 and the notches 11. Opposite the pointed spade 18 on the second side 10b is a flat spade 12 defined by notches 11 on either side of the flat spade 12. The notches 11 are also partly defined by the blade arms on a second side 10b of the blade. Pinch pockets 17 are present between the flat spade 12 and the notches 11 on the second side 10b of the blade. FIG. 17 shows a similar blade to FIG. 16 with the blade arms 34 being thicker or wider.

Figure 9:
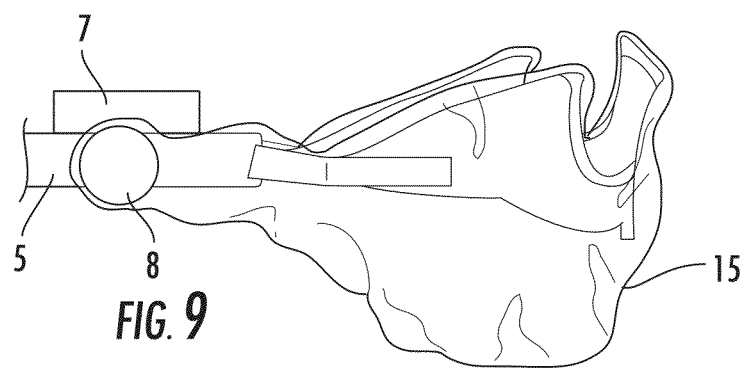
FIG. 9 shows a right side view of FIG. 3 of the head assembly of the waste collection device of a first embodiment fitted with a plastic bag.

FIGS. 8-11 show a bag 15 attached to the waste collection device 50 of a first embodiment. FIG. 9 shows a horizontal orientation with the bag 15 fixed in place. Prior to taking the pet for a walk, or for yard cleanup the bag 15 is preferably attached to the waste collection device.

The bag 15 (type 15a, 15b, 15c) used with the waste collection device 50, 60, 70 of any of the embodiments may have handles 40 or no handles at all. The handle 40 is defined as an opening 41 in the bag 15 in which a user can grip the bag 15 or place a hand through to hold the bag 15. The handles 40 may be centrally located 15a or on the sides of the bag 15b. Bag 15a is a typical plastic grocery shopping bag. The handles 40 are large and extend from the body of the bag 15a. Bag 15b has horizontal oval handles 40 that do not extend significantly from the body of the bag. Additionally, the bag 15c may have no handles at all. The waste collection device 50, 60, 70 of the present invention is economical in that any plastic bag may be used to collect the pet waste. Special bags are not needed. Furthermore, by using a bag, the device isolates the contact between a user and the waste collected.

Figure 26:
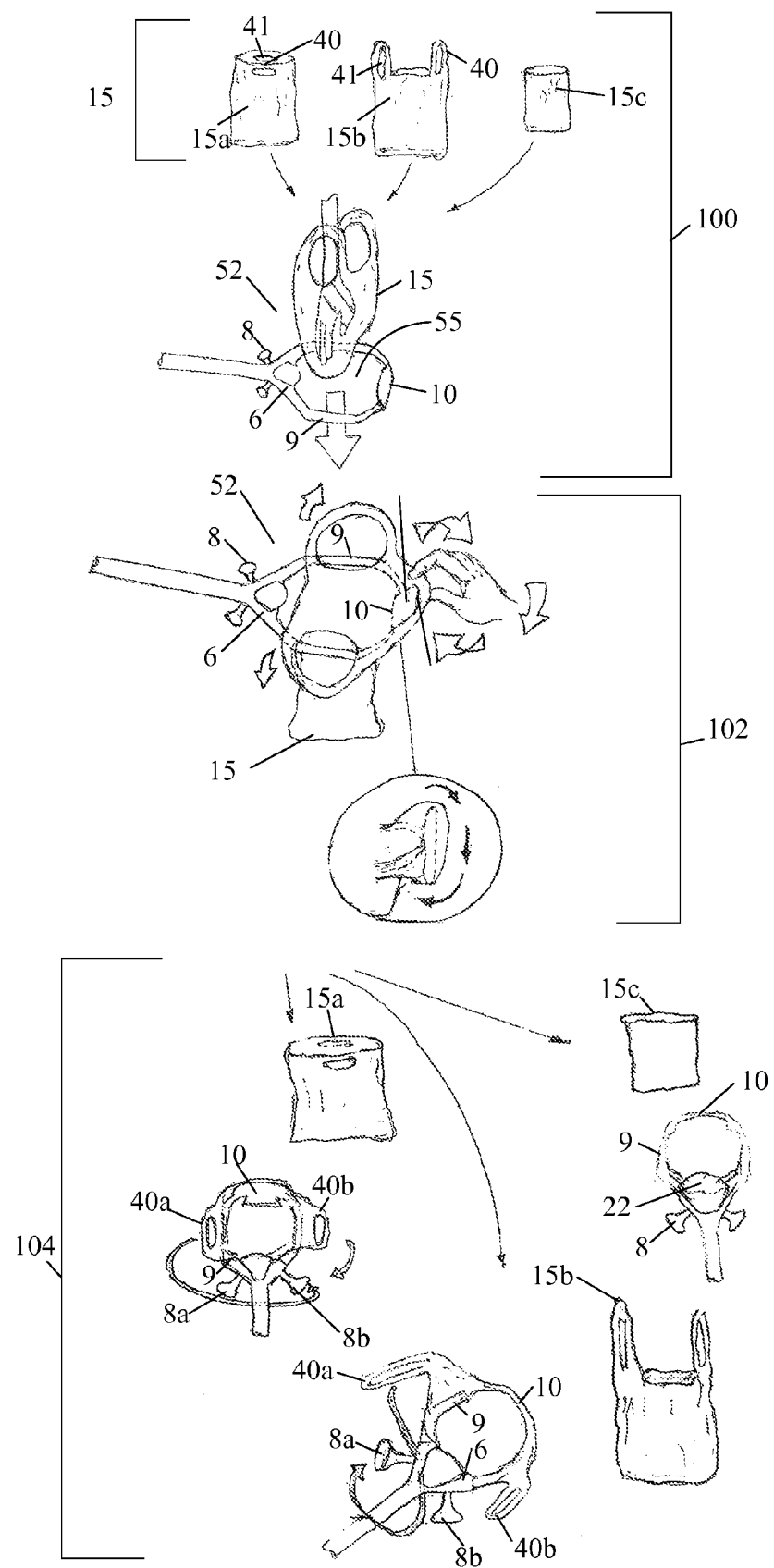
FIG. 26 shows a schematic of a method of how to attach different types of collection bags to waste collection devices of the present invention.

The method in which the bag 15a-15c is attached to the waste collection device of any of the embodiments is shown in FIG. 26. In a first step, the bag 15a-15c is inserted through the opening 55 formed by the head assembly 52 of the waste collection device 50, 60, 70 by aligned any handles 40 of the bag 15a, 15b perpendicular to the blade 10 and pushing the bag through the opening 55 until the handles 40 or a portion of the bag remains above the opening 55 (step 100). In other words, any handles 40 are aligned with the arm supports 9 of the device.

The portion of the bag 15a-15c that does not have handles 40 and is adjacent the blade 10 is pulled over an edge of the blade on the first side 10a of the blade 10 and tucked under a second edge of the blade on the second side 10b of the blade and the bag is pulled in a direction away from the blade (step 102). The pulling of the bag 15a-15c in a direction away from the blade 10 pulls the bag taut and sets the bag securely to the head assembly 52, for example, as shown in FIGS. 9 and 10.

Figure 10:
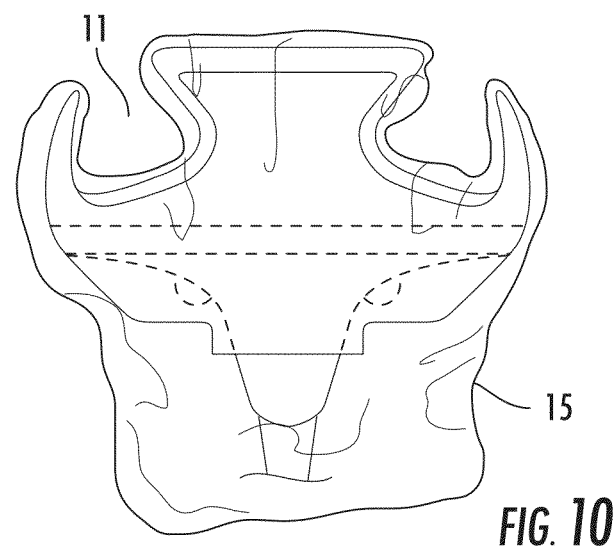
FIG. 10 shows a front view of FIG. 4 of the head assembly of the waste collection device of a first embodiment fitted with a plastic bag.

It should be noted that while the first side 10a of the blade 10 is shown as the spade portion 12 and the second side 10b of the blade is shown as the tongue in FIGS. 9 and 10, the sides are applied to whatever blade shape is present, and the sides are assigned in the method only to discuss the position of the bag relative to the blade.

Then, the bag 15a-15c is secured to the head structure 6 (step 104). Tension and friction keeps the bag 15a-15c firmly in place.

The steps of securing the bag 15 to the head structure 6 varies depending on the type of handles 40 present on the bag being attached to the waste collection device 50, 60, 70. For a bag 15a in which the holes 41 defining the handles 40 are along a centerline, a first handle 40a is pulled under the adjacent first peg support 8a across and underneath the handle 51 and placed on the other second peg support 8b opposite the first peg support 8a. The second handle 40b is pulled under the adjacent second peg support 8b across and underneath the handle 51 and placed on the first peg support 8a opposite the second peg support 8b. The wrapping of the handles 40a, 40b of the bag about the handle 51 of the device takes up any excess slack that may be present. Alternatively, depending on the size of the bag, the holes may just each be placed around the peg supports 8.

Similarly for a bag 15b with handles 40 on either side of the bag, a first handle 40a is pulled under the adjacent first peg support 8a across and underneath the handle 51 and placed on the other second peg support 8b opposite the first peg support 8a. The second handle 40b is pulled under the adjacent second peg support 8b across and underneath the handle 51 and placed on the first peg support 8a opposite the second peg support 8b. The wrapping of the handles 40 of the bag about the handle 51 of the device takes up any excess slack that may be present. Alternatively, depending on the size of the bag, the holes may just each be placed around the peg supports 8.

For a bag 15c with no handles 40, the waste collection device of the second or third embodiment is preferably used. The portion of the bag 15c that is located adjacent to the head structure 6 is clamped 22 into place or pushed into the depression 39 to secure the bag in place.

Optionally, the bag 15 is then pulled taunt around the notches 11 of the blade 10 to keep any excess of the bag out of the way when using the device on a surface to pick up waste.

Once the bag 15 has been secured to the waste collection device 50, 60, 70, the waste collection device may be used to catch waste from a pet or to pick up waste present on a surface.

When discarding the bag 15, a reverse procedure is performed from that of fixing the bag on the head assembly 51. For example, to remove the bag 15a or 15b, the handle 40a of the bag around the first peg 8a is removed from the first peg 8a, and passed under the telescoping handle 51 and the handle 40b of the bag around the second peg 8b is removed from the second peg 8b and passed under the telescoping handle 51. Then, the bag 15a, 15b may be removed from the opening 55 defined by the head assembly 51. To move the bag 15c from the head assembly 51, the clamp 22 is released or the bag 15c removed from the depression 39 in the head structure 6 and removed from the opening 55 defined by the head assembly 51.

Figure 11:
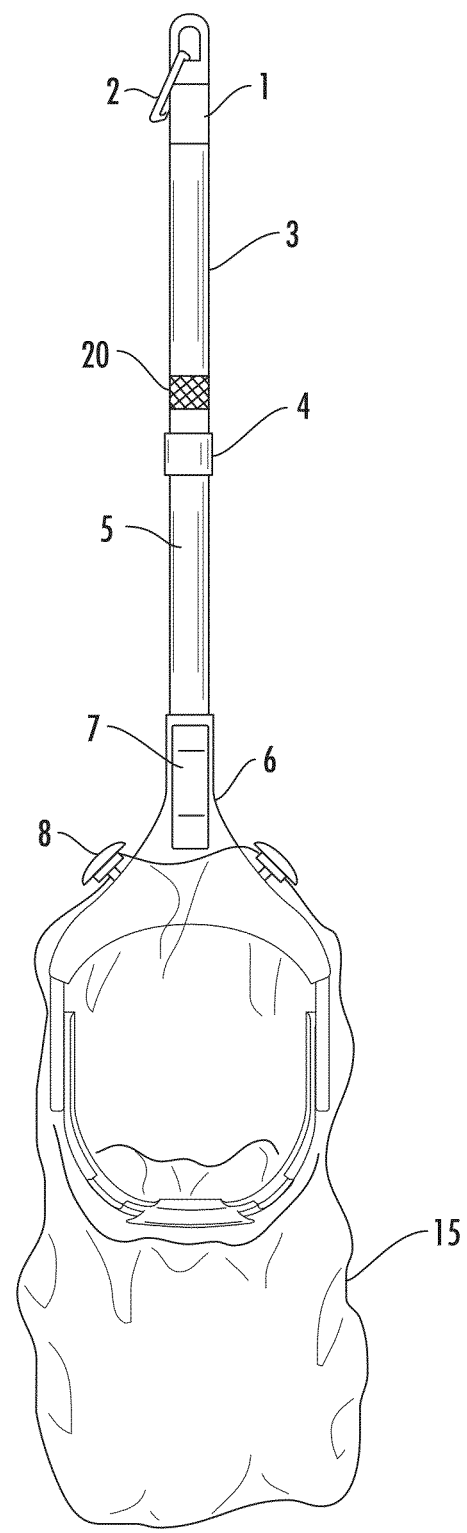
FIG. 11 shows a front view of the waste collection device of a first embodiment fitted with a plastic bag.

To catch the waste from the pet, the waste collection device 50, 60, 70 may be positioned under the tail of the squatting pet. The waste collection device 50, 60, 70 may be used to collect multiple waste droppings and can be carried during the walking of the pet in an upright manner so as not to allow the pet droppings to leave the bag secured to the waste collection device as shown in FIG. 11.

Figure 12:
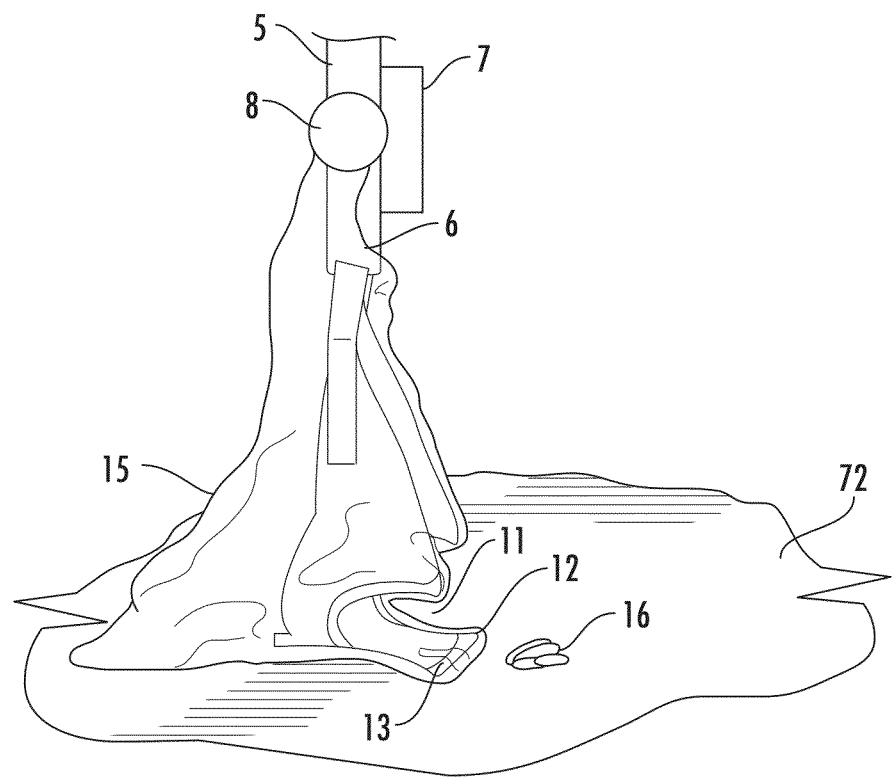
FIG. 12 shows a side view of the waste collection device with a bag scooping waste droppings on a flat surface.

When pet waste or waste droppings are present on a surface, the waste collection device 50 can be used to scoop up the waste droppings. FIG. 12 shows the waste collection device 50 of the first embodiment being used to collect pet droppings from a relatively flat surface 72, for example a paved surface. The portion of the blade 10 that is most effective for collecting the waste from a flat surface is the tapered edge 13 of the spade portion 12, 18 of the blade. To collect waste droppings on the flat surface 72, a user aligns the tapered edge 13 of the spade portion 12, 18 and while maintaining the spade portion 12, 18 of the blade 10 parallel with the ground, the user snaps their wrist to move the spade portion 12, 18 underneath the waste droppings 16 to scoop the waste droppings into the bag 15 of the waste collection device 50.

Figure 13:
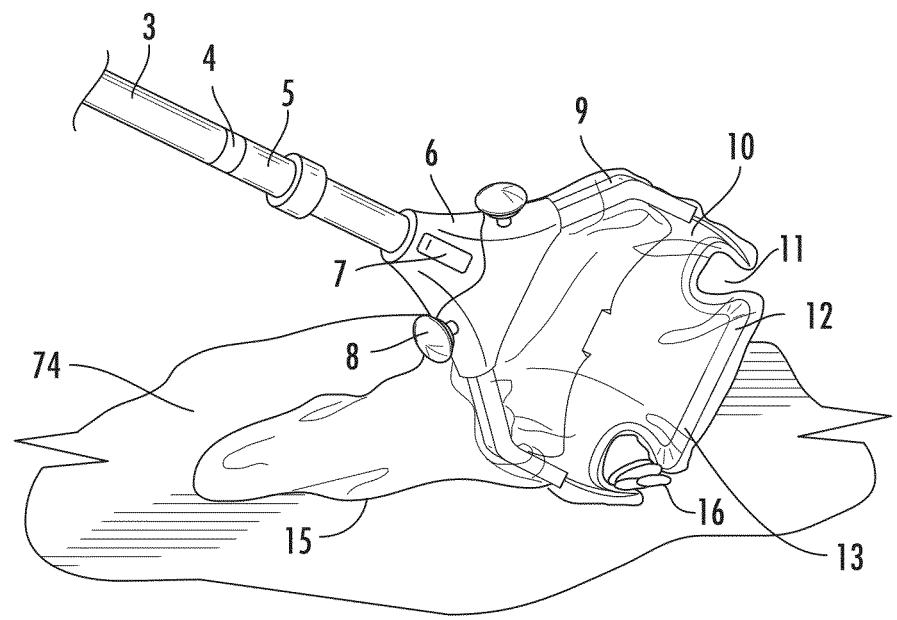
FIG. 13 shows a perspective view of the waste collection device picking up of droppings on an irregular surface.

FIG. 13 shows the waste collection device 50 of a first embodiment, being used to collect pet droppings 16 from a surface with an irregular surface 74, such as surface with vegetation. To collect pet droppings on an irregular surface 74, the blade 10 of the waste collection device is angled relative to the irregular surface 74 so that the tapered edge 13 of the notch 11 in addition the spade portion 12, 18 can contact the pet droppings 16. The angling of the waste collection device 50, 60, 70 in this manner provides additional surface area, for example the tapered edge 13 of the notch 11 in which to assist in picking or scooping up the waste droppings 16. Once the blade 10 of the waste collection device 50 is angled relative to the surface 72 and the pet droppings 16, the user can either conduct a wiggle or snap motion to capture the dropping 16, forcing the dropping up over the blade and into the bag 15. The wrist technique used may be slightly varied based on the texture and consistency of the droppings.

The waste collection device 50 may be used to collect numerous pet droppings 16 whether from catching the pet droppings or collecting the pet droppings from a surface 72, 74 before having to replace the bag 15.

To pick up pet droppings from a flat surface using the waste collection devices 60, 70 of the second and third embodiments, a user aligns the tapered edge 13 of the flat spade portion 12 on the first side 10a of the blade and while maintaining the flat spade portion 12 of the blade 10 parallel with the ground, the user snaps their wrist to move the spade portion 12 underneath the waste droppings 16 to scoop the waste droppings into the bag 15 of the waste collection device 50, similar to a shoveling movement.

To pick up pet droppings from an irregular surface, for example a surface with vegetation using the waste collection devices 60, 70 of the second and third embodiments, a user aligns the tapered edge 13 of the tongue 14 on the second side 10b of the blade and while maintaining the tongue 14, which preferably has a rounded contour parallel with the ground, the user snaps their wrist to move the spade portion 12 underneath the waste droppings 16 to scoop the waste droppings into the bag 15 of the waste collection device 50, similar to a shoveling movement.

In any of the embodiments, a spring clip 2 may be attached to the handle grip 1 and the clip may be clipped onto a leash of the pet being walked, allowing one hand free for the pet walker. When the device is clipped to the leash, the telescoping handle is preferably in the non-extended position.

In any of the embodiments, a light 7 may be mounted to head structure 6 or alternatively may be present within the handle 51 to provide illumination of the head structure 6 for using the device at night.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A waste collection device for receiving a bag comprising a body having an open end and a closed end, the waste collection device comprising:

a handle having a grip end and a head end;

a symmetric head assembly mounted to the head end of the handle defining an opening for receiving and attaching a bag comprising:
- a head structure defining a depression covered by a flexible covering for receiving a portion of the bag;
- a pair of support arms mounted to the head structure and extending away from the head structure; and
- a blade having blade arm portions mounted to head structure through the pair of support arms and at least one spade portion for scooping waste droppings into the bag, the spade portion having notches on at least one side;
- wherein the body of the bag fits in the opening formed by the head assembly and the body of the bag at the open end is folded over the support arms and the spade portion of the blade, securing the bag to the head assembly for collection of waste.

2. The device of claim 1, wherein the blade further comprises a tongue.

3. The device of claim 1, wherein the spade portion has a flat edge.

4. The device of claim 1, wherein the spade portion has a pointed edge.

5. The device of claim 1, wherein the head structure further comprises a clamp for holding the bag to the head structure.

6. The device of claim 1 further comprising a light mounted to the head structure.

7. The device of claim 1, wherein the blade is fixedly mounted the pair of support arms.

8. The device of claim 1, wherein the blade is removably mounted to the pair of support arms.

9. The device of claim 1, further comprising a pair of bag supports, one on each side of the head structure.

10. A waste collection device for receiving a bag comprising a body having an open end, the waste collection device comprising:
- a handle having a grip end and a head end;
- a symmetrical head assembly mounted to the head end of the handle defining an opening for receiving and attaching a bag comprising:
  - a head structure defining a depression covered by a flexible covering for receiving a portion of the bag;
  - a pair of support arms mounted to the head structure and extending away from the head structure; and
  - a blade having blade arm portions mounted to the head assembly through the pair of support arms and a flat spade portion on a first side for scooping waste droppings into the bag, and a tongue for scooping waste droppings on irregular surfaces into the bag comprising a rounded spade portion on a second side, opposite the first side;
  - wherein the body of the bag fits in the opening formed by the head assembly and the body of the bag at the open end is folded over the support arms, the flat spade portion and the tongue of the blade, securing the bag to the head assembly for collection of waste.

11. A method of attaching a bag comprising a body having an open end and a closed end, to a waste collection device comprising a handle mounted to a head assembly defining an opening for receiving the bag comprising: a symmetric head structure defining a depression covered by a flexible covering, a pair of bag supports on either side of the head structure, a pair of support arms mounted to the head structure extending away from the head structure; and a blade having blade arm portions mounted to the pair of support arms and at least one spade portion for scooping waste droppings into the bag on a first side, the method comprising the steps of:
- a) placing the body of the bag in the opening formed by the head assembly;
- b) folding a portion of the body of the bag at the open end over the first side of the blade and tucking the body of the bag at the open end under a second edge of the blade without puncturing the bag; and
- c) securing the body of the bag to the head structure.

12. The method of claim 11, wherein the step of securing the bag to the head structure further comprises:
- pulling a first handle opening defined by a first handle of the bag under a first support and the handle of the device;
- securing the first handle opening defined by the first handle of the bag to a second support;
- pulling a second handle opening defined by a second handle of the bag under the second support and handle of the device; and
- securing the second handle opening defined by the second handle of the bag to the first peg support.

13. The method of claim 11, wherein the step of securing the bag to the head structure further comprises clamping a portion the bag to the head structure through a toothed clamp coupled to the head structure.

14. The method of claim 11, wherein the step of securing the bag to the head structure further comprises inserting a portion of the bag into the depression defined by the head structure and covered by the flexible covering.

15. The device of claim 10, further comprising a pair of bag supports, one on each side of the head structure.

16. The device of claim 10, wherein the head structure further comprises a clamp on either side of the head structure for holding the bag to the head structure.

17. The device of claim 10 further comprising a light mounted to the head structure.

18. The device of claim 10, wherein the blade is fixedly mounted the pair of support arms.

19. The device of claim 10, wherein the blade is removably mounted to the pair of support arms.

* * * * *